(12) United States Patent
Hatta et al.

(10) Patent No.: US 7,022,632 B2
(45) Date of Patent: Apr. 4, 2006

(54) COMPOSITE NONWOVEN FABRIC FOR PROTECTIVE CLOTHING AND PRODUCTION METHOD THEREOF

(75) Inventors: Nobuo Hatta, Hyogo (JP); Yasurou Araida, Osaka (JP); Masami Tadokoro, Chiba (JP)

(73) Assignees: Kuraray Co., Ltd., Kurashiki (JP); Chori Co., Ltd., Osaka (JP)

( * ) Notice: Subject to any disclaimer, the term of this patent is extended or adjusted under 35 U.S.C. 154(b) by 233 days.

(21) Appl. No.: 10/440,147

(22) Filed: May 19, 2003

(65) Prior Publication Data

US 2004/0176009 A1    Sep. 9, 2004

(30) Foreign Application Priority Data

May 20, 2002  (JP)  ............................. 2002/144829

(51) Int. Cl.
  *B32B 5/06* (2006.01)
  *B32B 5/26* (2006.01)
(52) U.S. Cl. ....................... 442/389; 442/268; 442/319; 442/340; 442/381; 442/382; 442/384; 442/400; 442/408
(58) Field of Classification Search ................ 442/381, 442/389, 400, 408, 340, 382, 384, 268, 319
See application file for complete search history.

(56) References Cited

U.S. PATENT DOCUMENTS

| | | | | |
|---|---|---|---|---|
| 4,508,775 A | * | 4/1985 | Adiletta | 442/268 |
| 4,828,556 A | * | 5/1989 | Braun et al. | 604/365 |
| 5,145,727 A | * | 9/1992 | Potts et al. | 428/198 |
| 5,288,791 A | * | 2/1994 | Collier et al. | 428/903 |
| 5,520,980 A | | 5/1996 | Morgan et al. | |
| 5,616,408 A | * | 4/1997 | Oleszczuk et al. | 442/346 |
| 5,681,645 A | | 10/1997 | Strack et al. | |
| 5,798,167 A | | 8/1998 | Connor et al. | |
| 6,286,145 B1 | * | 9/2001 | Welchel et al. | 442/381 |

FOREIGN PATENT DOCUMENTS

| | | |
|---|---|---|
| EP | 0 452 727 | 10/1991 |
| EP | 1 022 125 | 7/2000 |
| EP | 1 174 257 | 1/2002 |
| GB | 2264512 A * | 1/1993 |
| WO | WO 99/14039 | 3/1999 |

OTHER PUBLICATIONS

Patent Abstracts of Japan, JP 11-061625, Mar. 5, 1999.

* cited by examiner

*Primary Examiner*—Norca L. Torres
(74) *Attorney, Agent, or Firm*—Oblon, Spivak, McClelland, Maier & Neustadt, P.C.

(57) ABSTRACT

The composite nonwoven fabric for protective clothing of the present invention comprises (A) a water vapor-permeable, water-resistant nonwoven fabric made of polyolefin-based ultra-fine fibers having an average fiber diameter of 5 μm or less, (B) a heat-bonding nonwoven fabric made of thermoplastic elastomer ultra-fine fibers, and (C) a porous fabric. The nonwoven fabric B is interposed between the nonwoven fabric A and the porous fabric C, and the fabrics A, B and C being integrally bonded to each other. The composite nonwoven fabric is suitable for a protective clothing because it is water vapor-permeable and water-resistant on its outer side to be exposed to outside air, and is of high strength, sweat-absorbable and antistatic on its inner side, and also well-balanced in these properties.

5 Claims, No Drawings

COMPOSITE NONWOVEN FABRIC FOR PROTECTIVE CLOTHING AND PRODUCTION METHOD THEREOF

BACKGROUND OF THE INVENTION

1. Field of the Invention

The present invention relates to a composite nonwoven fabric for protective clothing (protective garment) and a production method thereof, and more particularly, relates to a composite nonwoven fabric that is suitably used as protective clothing such as ordinary work clothing and medical underwear and gown because of its excellent water vapor permeability, water resistance, strength such as tear strength and feeling, and a production method of such a composite nonwoven fabric.

2. Description of the Prior Art

There is a recent tendency toward disposable protective clothing. In periodic overhaul works for machine and apparatus, for example, an ordinary work clothing is severely stained with dirt, etc., requiring a disposable work clothing. Also, in medical applications, a disposable medical clothing is needed for the protection against infections, etc.

The protective clothing used in these applications is required to have a water repellency and a bacteria-barrier property on its outer side exposed to the air and a sweat absorption on its inner side as well as a water vapor permeability for preventing stuffy feeling and an antistatic property as a whole.

Hitherto, the following products have been proposed as protective clothing and actually put on the market. However, these conventional protective clothing have some defects and, therefore, fail to fully satisfy the above requirements.

For example, there is known an ordinary work clothing made of a polyolefin nonwoven fabric produced by flash spinning. Such a work clothing is excellent in various barrier properties due to the polyolefin nonwoven fabric, but has a poor water vapor absorption, easily gives humid and stuffy feeling, and is uncomfortable under wear due to too a small thickness. A protective clothing using a hydroentangled nonwoven fabric made of a polyester fiber web/pulp sheet laminate, as proposed in Japanese Patent Application Laid-Open No. 59-94659, is also put on the market. The protective clothing is good in the feeling, but poor in the water repellency. Although the improvement of the water repellency is attempted by post treatments, the water pressure resistance is improved only to limited extent.

Further, a protective clothing made of a polyolefin-based spunlaid nonwoven fabric/meltblown nonwoven fabric/spunlaid nonwoven fabric composite, i.e., a composite nonwoven fabric represented by a so-called SMS, is also put on the market. However, this protective clothing has drawbacks such as poor feeling, stiff feeling and a low sweat absorption despite its low costs. To remove the drawbacks, Japanese Patent Application Laid-Open No. 10-96156 proposes a base fabric for disposable clothing which is produced by laminating spunlaid nonwoven fabrics made of aliphatic polyester on both surfaces of the meltblown nonwoven fabric. However, a disposable clothing made of such a base fabric is still insufficient in the water resistance and the bacteria-barrier property despite its improved hydrophilicity.

A clothing made of a composite fabric having a filter layer comprising a water vapor-permeable, water-resistant film, as proposed in Japanese Patent Application Laid-open No. 10-158909, is also put on the market. The proposed composite fabric has a low water vapor permeability to give humid and stuffy feeling and generates uncomfortable noise peculiar to the film. In addition, a protective clothing made of a composite comprising a filter layer and a nonwoven fabric is also put on the market. The filter layer is formed by making a thermoplastic elastomer resin into a hydrophilic film to impart the water vapor permeability. However, this protective clothing has an excessively high swelling property and a low shape stability despite its good water vapor permeability.

SUMMARY OF THE INVENTION

An object of the present invention is to remove drawbacks of various protective clothing currently put on the markets, and to provide a composite nonwoven fabric suitable for producing a protective clothing (protective garment) which has well-balanced properties, namely which is water vapor-permeable and water-resistant on its outer side exposed to outside air, and is of high strength, sweat-absorbable and antistatic on its inner side.

As a result of extensive study for developing the above composite nonwoven fabric for protective clothing having well-balanced properties, the inventors have found that the above object is achieved by a composite nonwoven fabric prepared by integrally bonding an outer water vapor-permeable, water-resistant nonwoven fabric made of polyolefin-based ultra-fine fibers, an inner porous fabric and a core heat-bonding nonwoven fabric made of thermoplastic elastomer ultra-fine fibers which is interposed between the outer and inner fabrics. The present invention has been accomplished on the basis of this finding.

Thus, the present invention provides:

(1) a composite nonwoven fabric for protective clothing (protective garment), comprising:
   (A) a water vapor-permeable, water-resistant nonwoven fabric made of polyolefin-based ultra-fine fibers having an average fiber diameter of 5 µm or less;
   (B) a heat-bonding nonwoven fabric made of thermoplastic elastomer ultra-fine fibers; and
   (C) a porous fabric,
   the nonwoven fabric B being interposed between the nonwoven fabric A and the porous fabric C, and the fabrics A, B and C being integrally bonded to each other;

(2) the composite nonwoven fabric according to the aspect 1, wherein the water vapor-permeable, water-resistant nonwoven fabric A is a meltblown nonwoven fabric;

(3) the composite nonwoven fabric according to the aspect 1 or 2, wherein the water vapor-permeable, water-resistant nonwoven fabric A is made from a colored masterbatch;

(4) the composite nonwoven fabric according to the aspects 1 to 3, wherein the heat-bonding nonwoven fabric B is a meltblown nonwoven fabric made of polystyrene-based thermoplastic elastomer ultra-fine fibers, ultra-fine fibers of a mixture of a polystyrene-based thermoplastic elastomer and a polyolefin resin, or polyolefin-based thermoplastic elastomer ultra-fine fibers;

(5) the composite nonwoven fabric according to the aspects 1 to 4, wherein the porous fabric C is a hydroentangled nonwoven fabric comprising 100% of polyester fibers, 100% of rayon fibers or a mixture of a polyester fiber and a rayon fiber;

(6) the composite nonwoven fabric according to the aspects 1 to 4, wherein the porous fabric C is a spunlaid nonwoven fabric made of polyester, nylon or polypropylene;

(7) the composite nonwoven fabric according to the aspects 1 to 4, wherein the porous fabric C is a knitted or woven fabric;

(8) a protective clothing made of the composite nonwoven fabric of the aspects 1 to 7;
(9) a process for producing a composite nonwoven fabric for protective clothing, comprising:

successively laminating a heat-bonding nonwoven fabric B made of thermoplastic elastomer ultra-fine fibers and a porous fabric C on one surface of a water vapor-permeable, water-resistant nonwoven fabric A made of polyolefin-based ultra-fine fibers having an average fiber diameter of 5 μm or less, and integrally bonding the laminated fabrics A to C to each other;
(10) the process according to the aspect 9, wherein the laminated fabrics A to C are integrally bonded to each other by embossing or calendering; and
(11) the process according to the aspect 9 or 10, wherein the water vapor-permeable, water-resistant nonwoven fabric A is pre-pressed at a temperature equal to or higher than a treating temperature for the integral bonding.

DETAILED DESCRIPTION OF THE INVENTION

The composite nonwoven fabric for protective clothing (protective garment) according to the present invention is a three-layered laminate prepared by integrally bonding a water vapor-permeable, water-resistant nonwoven fabric A, a porous fabric C and a heat-bonding nonwoven fabric B that is interposed between the fabrics A and C. The composite nonwoven fabric is made into a protective clothing with the water vapor-permeable, water-resistant nonwoven fabric A being positioned outside and the porous fabric C being positioned inside.

As the water vapor-permeable, water-resistant nonwoven fabric A, there may be suitably used a meltblown nonwoven fabric made of polyolefin-based ultra-fine fibers having an average fiber diameter of 5 μm or less. Fibers having an average fiber diameter of more than 5 μm can be produced by the meltblown method employing lower spinning temperatures or reduced air flow rates. However, the average fiber diameter is selected from the range of 5 μm or less and preferably 1 to 3 μm to attain the required water vapor permeability and water resistance.

The mass per unit area of the water vapor-permeable, water-resistant nonwoven fabric A is preferably 30 g/m² or less and more preferably 10 to 25 g/m², although not particularly limited thereto. A mass per unit area of more than 30 g/m² can be applicable, but not preferable because the increased mass per unit area and thickness of the resultant composite nonwoven fabric are likely to make the feeling unpleasant and also the production cost is increased. The water pressure resistance, i.e., a representative property of the water resistance, increases to some degree in proportion to the mass per unit area. However, a further improvement in the water pressure resistance is not so expected even though the mass per unit area exceeds 30 g/m².

The water vapor-permeable, water-resistant nonwoven fabric A preferably has a water vapor permeability of 7000 to 9000 g/m²·day and a water pressure resistance of 500 to 1000 mmH₂O.

The water vapor permeability and the water pressure resistance may be regulated as desired by changing the production conditions and the mass per unit area. If an especially high water pressure resistance is required, it is advantageous to subject the water vapor-permeable, water-resistant nonwoven fabric A to pre-press treatment at a temperature equal to or higher than the temperature for the integrally bonding process. When the process for integral bonding is performed by calendering, the pre-press treatment may be not specially required because the water vapor-permeable, water-resistant nonwoven fabric A is pressed simultaneously with the integral bonding at the same temperatures. However, when performed by embossing, the pretreatment is preferably employed. Specifically, the water vapor-permeable, water-resistant nonwoven fabric A is pre-pressed at about 130 to about 140° C. to impart a higher water vapor permeability and water resistance. If the water vapor permeability and water resistance fail to reach the intended level by the press treatment in the above temperature range, the intended water vapor permeability and water resistance can be achieved by a press treatment under 2 to 8 MPa. The press treatment speed is preferably 10 to 30 m/min.

The water vapor-permeable, water-resistant nonwoven fabric A is also required to have a bacteria-barrier property in addition to the water vapor permeability and water resistance when used in medical applications. As the results of study on the bacteria-barrier property, it has been found that a water pressure resistance of 500 mmH₂O or higher corresponds to a bacteria-barrier property of 95% or more. Also, the bacteria-barrier property may be represented by an air permeability.

In the conventional process for integral bonding by embossing, fabrics made of the same type of resins such as polyolefin resins are generally integrally bonded to each other by melting or softening under pressure without using a heat-bonding nonwoven fabric. In the present invention, fabrics even when made of different resins that are incompatible with each other can be integrally bonded into a composite at low temperatures because the heat-bonding nonwoven fabric is used. The low temperatures referred to above mean temperatures equal to or lower than the temperatures of the pre-press treatment of the water vapor-permeable, water-resistant nonwoven fabric A. Although the process for integral bonding may be carried out by embossing at temperatures higher than the temperature conditions for the pre-pressing treatment, pinholes may be undesirably formed because of the re-melting of the water vapor-permeable, water-resistant nonwoven fabric A. For example, a composite nonwoven fabric using no adhesive nor heat-bonding nonwoven fabric, such as SMS, is generally produced by pressing a melt-softened water vapor-permeable, water-resistant nonwoven fabric A against another nonwoven fabric to integrally bond to each other. Therefore, the water vapor-permeable, water-resistant nonwoven fabric A tends to be damaged to have pinholes.

In the present invention, the water vapor-permeable, water-resistant nonwoven fabric A is usually white in its color, but may be colored according to its applications using a colored masterbatch (pigment masterbatch). For example, in medical applications, the fabric may be desirably colored to dark blue or dark green for masking the color of blood.

An ordinary work clothing may also be usually white in its color. In some applications, a yellow color indicative of danger is desired. The coloration of the fabric may be performed using a colored masterbatch without reducing the water vapor permeability and the water resistance.

The heat-bonding nonwoven fabric B as an intermediate layer of the composite nonwoven fabric of the present invention is made of thermoplastic elastomer ultra-fine fibers. The thermoplastic elastomer ultra-fine fibers may be not particularly limited as far as they are melted at lower temperatures as compared with the fibers constituting the water vapor-permeable, water-resistant nonwoven fabric A mentioned above and the porous fabric C described below, each being respectively disposed on both surfaces of the heat-bonding nonwoven fabric B. Examples of the thermoplastic elastomers for constituting the ultra-fine fibers include a polystyrene-based thermoplastic elastomer, a polyolefin-based thermoplastic elastomer, a polyurethane-based thermoplastic elastomer, a polyester-based thermoplastic elastomer, a polyether-based thermoplastic elastomer, and a polyamide-based thermoplastic elastomer. Preferred are ultra-fine fibers of the polystyrene-based thermoplastic elastomer, a mixture of the polystyrene-based thermoplastic elastomer and a polyolefin resin, or the polyolefin-based thermoplastic elastomer. With the heat-bonding nonwoven fabric B made of such ultra-fine fibers, the heat-bonding strength of the heat-bonding nonwoven fabric B with the water vapor-permeable, water-resistant nonwoven fabric A or with the porous fabric C can be enhanced, thereby providing a composite nonwoven fabric having a high exfoliation strength.

More preferably, the heat-bonding nonwoven fabric B is made of ultra-fine fibers of the polystyrene-based thermoplastic elastomer or a mixture of the polystyrene-based thermoplastic elastomer and the polyolefin resin.

Examples of the polystyrene-based thermoplastic elastomer include a styrene-butadiene-styrene block copolymer (SBS), a styrene-isoprene-styrene block copolymer (SIS), SEBS (hydrogenated SBS), and SEPS (hydrogenated SIS). These polystyrene-based thermoplastic elastomers may be used singly, in combination of two or more, or in the form of a mixture of at least one polystyrene-based thermoplastic elastomer and the polyolefin resin.

The mixture of the polystyrene-based thermoplastic elastomer and the polyolefin resin for producing ultra-fine fibers of the heat-bonding nonwoven fabric B contains the polystyrene-based thermoplastic elastomer preferably in an amount of 50% by mass or more, more preferably 60% by mass or more of the mixture in view of the heat-bonding ability. The polyolefin resin to be mixed with the polystyrene-based thermoplastic elastomer may be polypropylene, polyethylene, and ethylene-propylene copolymer. The polyolefin resins may be used singly or in combination of two or more.

Examples of the polyolefin-based thermoplastic elastomer include a physical mixture comprising a polyolefin resin such as polypropylene and polyethylene as the hard segment and an olefin rubber such as ethylene-propylene-diene copolymer (EPDM) as the soft segment. Also, there may be used a thermoplastic elastomer obtained by partially condensing the hard segment and the soft segment or by mixing the hard segment and the soft segment under vulcanization.

The heat-bonding nonwoven fabric B is preferably produced from the thermoplastic elastomer by a meltblown method, although not limited thereto, because this method facilitates the production of the ultra-fine fibers to allow the production of a dense nonwoven fabric. The average fiber diameter is preferably 15 μm or smaller, more preferably 10 μm or smaller and still more preferably 1 to 5 μm, although not limited thereto. Smaller the average fiber diameter, it tends to further improve the water resistance of the water vapor-permeable, water-resistant nonwoven fabric A. Namely, during the process for integral bonding by embossing or calendering while melting and softening the heat-bonding nonwoven fabric B, the heat-bonding nonwoven fabric B tends to form a film upon melting and softening when it is made dense, thereby showing a function of enhancing the water resistance of the water vapor-permeable, water-resistant nonwoven fabric A in addition to a mere bonding function. For example, when a heat-bonding nonwoven fabric B having a mass per unit area of 10 g/m$^2$ which is made of the polystyrene-based thermoplastic elastomer is integrally bonded by embossing, a water pressure resistance about 200 mmH$_2$O or more higher than exhibited by the water vapor-permeable, water-resistant nonwoven fabric A itself is expected. When integrally bonded by calendering, a water pressure resistance about 300 mmH$_2$O or more higher is expected. If integrally bonded by heat embossing using a hot-melt adhesive or using no heat-bonding nonwoven fabric, the water pressure resistance of the resultant composite is at most the same as that of the water vapor-permeable, water-resistant nonwoven fabric A itself, or may be lowered because of the formation of pinholes.

The mass per unit area of the heat-bonding nonwoven fabric B is preferably 15 g/m$^2$ or less, more preferably 5 to 12 g/m$^2$, although not limited thereto. A mass per unit area exceeding 15 g/m$^2$ is economically disadvantageous and tends to cause an excessive film formation upon the integral bonding process, resulting in the reduction in the water vapor permeability despite the improvement in the water pressure resistance.

The porous fabric C to be disposed inside of a protective clothing made of the composite nonwoven fabric of the present invention is suitably selected depending on the use of the protective clothing such as work use and medical use and the purpose of use such as prevention of oil stain, prevention of water stain, prevention of rupture and protection against bacteria. The porous fabric C is basically selected from clothes having a suitable strength according to the applications and purposes of the composite nonwoven fabric. The porosity of the porous fabric C is required to provide an appropriate air permeability because it is disposed on inside of the protective clothing. The air permeability is preferably 20 to 50 cm$^3$/cm$^2$·s.

The porous fabric C may be a nonwoven fabric or a knitted or woven fabric. Examples of the nonwoven fabrics include hydroentangled nonwoven fabrics. In the hydroentangled nonwoven fabrics, fibers are entangled not only at its surface but also in its depth direction and the softness can be modified by changing the hydroentangling conditions. Further, the hydroentangled nonwoven fabrics are substantially free from chemical binders, exhibiting a soft feeling. Although the porous fabric C may be blended with a heat-fusible fiber, the resultant composite nonwoven fabric may have a hard feeling because heat is externally applied in the integral bonding process. Therefore, the porous fabric C is preferably comprises 100% of synthetic fiber or a mixture of a synthetic fiber and a natural fiber or regenerated fiber, for example, 100% of polyester fiber, 100% of rayon fiber or a mixture of polyester fiber and rayon fiber. The porous fabric C comprising 100% of polyester fiber have a good strength and an excellent feeling. The porous fabric C comprising 100% of rayon fiber is suitably used in sweaty conditions because of its high liquid absorption, high sweat absorption and antistatic property. However, since the rayon fiber is inferior to the polyester fiber in the strength, a mixture of the polyester fiber and the rayon fiber is preferably used when a strength is required. Although the rayon fiber may be replaced by cotton, the use of the rayon fiber is sufficient in view of the costs. The mixing ratio by mass of the polyester fiber to the rayon fiber is preferably 30/70 to 70/30, more preferably 40/60 to 60/40. The antistatic property expressed by the half-value period of electric charges is 2 min or more for 100% of polyester fiber, 0.5 s for 100% of rayon fiber and 0.7 s for a 50/50 by mass polyester fiber/rayon fiber mixture. Alternatively, the antistatic property expressed by its triboelectric voltage is initially 4500 V and 3250 V after one minute for 100% of polyester fiber; initially 120 V and 5 V after one minute for 100% of rayon fiber; and initially 1050 V and 145 V after one minute for the 50/50 by mass polyester fiber/rayon fiber mixture.

The porous fabric C may be a spunlaid nonwoven fabric when the strength and the cost performance are important. Examples of the material for the spunlaid nonwoven fabric include polyester fiber, nylon fiber and polypropylene fiber.

The porous fabric C may be a knitted or woven fabric when the feeling is important. Examples of the material for the knitted or woven fabric include natural fiber, regenerated fiber, synthetic fiber and blended yarns thereof.

The mass per unit area of the porous fabric C is preferably 30 g/m$^2$ or larger, although not limited thereto. The mass per unit area is more preferably 40 to 150 g/m$^2$ when the porous fabric C is made of a hydroentangled nonwoven fabric to attain a good texture and feeling. Since the spunlaid nonwoven fabric exhibits a good strength, the mass per unit area may be less than 30 g/m$^2$ in view of its strength only. However, a mass per unit area of less than 30 g/m$^2$ results in a poor texture to make the composite nonwoven fabric unfit for use in some cases. The same may be also applied to the knitted or woven fabric.

The composite nonwoven fabric for protective clothing according to the present invention may be produced by the following method.

The heat-bonding nonwoven fabric B made of thermoplastic elastomer ultra-fine fibers and the porous fabric C are successively laminated on one surface of the water vapor-permeable, water-resistant nonwoven fabric A made of polyolefin-based ultra-fine fibers, and then the laminated fabrics are integrally bonded with each other to produce the composite nonwoven fabric for protective clothing.

As described above, when a particularly high water pressure resistance is required, it is preferred to pre-pressing the water vapor-permeable, water-resistant nonwoven fabric A at temperatures equal to or higher than the temperatures for the process of integral bonding.

The process of integral bonding may be carried out by either embossing or calendering. In the process of integral bonding by embossing, a combination of an engraved roll heated by a heating medium such as steam and oil with a flat roll at ordinary temperature is used to integrally bond the water vapor-permeable, water-resistant nonwoven fabric A, the heat-bonding nonwoven fabric B and the porous fabric C according to the projecting engraved pattern. The press-bonding area ratio by the engraved roll is preferably about 2 to 30%, more preferably 5 to 20% of the surface area of the composite nonwoven fabric. When the press-bonding area ratio is less than 2%, a sufficient bonding strength is difficult to be attained. When the press-bonding area ratio exceeds 30%, the resultant composite nonwoven fabric tends to have a hard feeling. The treating temperature is usually about 130 to 140° C., although it varies depending upon the treating speed. The treating speed is preferably 10 to 30 m/min, and the pressure for integral bonding is preferably 2 to 5 MPa. A combination of the engraved roll and an ultrasonic wave utilizing the internal heat generation by the resin due to the ultrasonic wave in stead of the external heating may be applicable, but this method is rather poor in productivity.

The process of integral bonding by calendering, so-called a flat-embossing treatment, uses an apparatus comprising a plain roll that is heated by a heating medium and a non-heated rubber or plastic roll. With this combination, the fabrics are integrally bonded to each other by heating and pressing, and therefore, the method is also called as a flat method for making composite.

The water vapor permeability of the composite nonwoven fabric is preferably 5000 to 10000 g/m$^2$·day. The water pressure resistance is preferably 700 to 1500 mmH$_2$O, and the exfoliation strength is preferably 10 N or more.

The thus formed composite nonwoven fabric for protective clothing is excellent in not only the water vapor permeability and the water resistance but also the strength such as the tear strength and the exfoliation strength and the feeling, and is suitably used for protective clothing such as ordinary work clothing and medical underwear and gown.

The composite nonwoven fabric is made into the protective clothing, for example, by machine sewing. When subjected to a water pressure of 1000 mmH$_2$O or higher that is a standard value for preventing the exposure to dioxins, water leaks from sewing portions to extremely lower the water pressure resistance in some cases. To prevent the water leakage, preferably employed are a tape sewing in which an adhesive-coated sealing tape is bonded along a machine-sewing seam line and an ultrasonic sewing, with the ultrasonic sewing being more preferred because it requires no additional material and can be carried out in the same manner as in the machine sewing.

The composite nonwoven fabric of the present invention is enhanced particularly in the water vapor permeability and the water resistance. In some applications, an oil repellency and an alcohol repellency may be additionally required. For example, the oil repellency is required in the working sites undergoing severe oil stains, and the alcohol repellency is required in work clothing for ambulance men working at fire station. To attain the oil or alcohol repellency, the composite nonwoven fabric may be treated with a silicone resin or a fluororesin. The water vapor-permeable, water-resistant nonwoven fabric A may be treated before or after made into the composite. If the entire surface is treated before made into the composite, the bonding between the water vapor-permeable, water-resistant nonwoven fabric A and the heat-bonding nonwoven fabric B by the integral bonding treatment is likely to be insufficient. Therefore, the treatment is preferably made by gravure coating on the exposed surface of the water vapor-permeable, water-resistant nonwoven fabric A after made into the composite.

The present invention will be described in more detail by way of the following examples which should not be construed to limit the scope of the present invention thereto.

The properties of composite nonwoven fabrics obtained in the examples and comparative examples were measured by the following methods.

(1) Water Pressure Resistance

Measured according to the method A (low water pressure method) of JIS L 1092 "Testing methods for water resistance of textiles."

(2) Water Vapor Permeability

Measured according to the method A-1 (calcium chloride method) of JIS L 1099 "Testing methods for water vapor permeability of textiles."

(3) Exfoliation Strength

Measured according to JIS L 1086 "Testing methods of fusible interlining fabrics."

(4) Feeling

The sample was evaluated by hand feeling.

EXAMPLE 1

Step 1

Polypropylene (MFR=500 g/10 min) was meltblown to produced a nonwoven fabric A made of polypropylene ultra-fine fibers (average fiber diameter=2.3 μm; mass per unit area=15 g/m$^2$). The obtained raw fabric had a water pressure resistance of 540 mmH$_2$O.

Step 2

The nonwoven fabric A obtained in the step 1 was subjected to a separate step of press treatment between a heated steel plain roll and a rubber roll under conditions of a treating temperature of 138° C., a pressure of 3.4 MPa and a treating speed of 20 m/min to produce a nonwoven fabric A' having a water pressure resistance of 630 mmH$_2$O.

Step 3

A mixture comprising 60 parts by mass of a polystyrene-based thermoplastic elastomer (styrene-ethylene/propylene-styrene block copolymer (SEPS) available from Kuraray Co., Ltd. under the trade mark of "Septon") and 40 parts by mass of polypropylene (MFR=200 g/10 min) was meltblown to produce a heat-bonding nonwoven fabric B made of ultra-fine fibers (average fiber diameter=4.5 μm; mass per unit area=10 g/m$^2$).

Step 4

A cross-laid web comprising a 50/50 by mass mixture of polyester fiber (2.2 dtex, 51 mm) and rayon fiber (1.7 dtex, 40 mm) was made into a porous fabric C (drylaid nonwoven fabric C) having a mass per unit area of 40 g/m$^2$ by hydroentangling.

Step 5

The heat-bonding nonwoven fabric B made of meltblown ultra-fine fibers obtained in the step 3 was interposed between the nonwoven fabric A made of meltblown polypropylene ultra-fine fibers obtained in the step 1 and the hydroentangled nonwoven fabric C obtained in the step 4. The resulting laminate was integrally bonded by heat embossing between an engraved roll having a press-bonding area ratio of 20% and a flat roll with the nonwoven fabric A made of polypropylene ultra-fine fibers facing the engraved roll under the conditions of an engraved roll temperature of 134° C., a flat roll temperature of 100° C., a pressure of 2.9 MPa and a treating speed of 20 m/min, thereby producing a composite nonwoven fabric. The properties thereof are shown in Table 1.

EXAMPLE 2

The same procedure as in the step 5 of Example 1 was repeated except that the nonwoven fabric A made of polypropylene ultra-fine fibers was replaced by the pressed nonwoven fabric A' made of polypropylene ultra-fine fibers obtained in the step 2, thereby producing a composite nonwoven fabric. The properties thereof are shown in Table 1.

COMPARATIVE EXAMPLE 1

The same procedure as in the step 5 of Example 1 was repeated except for omitting the use of the heat-bonding nonwoven fabric B obtained in the step 3 to produce a composite nonwoven fabric. The properties thereof are shown in Table 1.

TABLE 1

| | Water pressure resistance (mmH$_2$O) | Water vapor permeability (g/m$^2$ · day) | Exfoliation strength (N) | Feeling |
|---|---|---|---|---|
| Example 1 | 750 | 9342 | 15.5 | good |
| Example 2 | 850 | 8510 | 12.6 | good |
| Comparative Example 1 | 390 | 12360 | easily exfoliated | good |

The results showed that the water pressure resistance of the composite nonwoven fabric of Example 1 was improved over the meltblown nonwoven raw fabric made of polypropylene ultra-fine fibers, because the raw fabric was bonded via the heat-bonding nonwoven fabric.

In Example 2, the water pressure resistance of the meltblown raw fabric used in Example 1 was improved by pressing. By making such a raw fabric into the composite, the composite nonwoven fabric having a further improved water pressure resistance was obtained.

In Comparative Example 1, the nonwoven fabrics made of different materials were attempted to bond to each other without using the heat-bonding nonwoven fabric, but resulted in failure. Further, the water pressure resistance was reduced because of the penetration of the rayon fibers into the polypropylene fibers.

EXAMPLE 3

A nonwoven fabric made of polypropylene ultra-fine fibers having a mass per unit area of 25 g/m$^2$ was produced in the same manner as in the step 1 of Example 1. The water pressure resistance thereof was 830 mmH$_2$O. The obtained nonwoven fabric was integrally bonded with the heat-bonding nonwoven fabric obtained in the step 3 of Example 1 and a porous polypropylene spunlaid nonwoven fabric (available from Shinwa Co., Ltd.; mass per unit area=40 g/m$^2$) in the same manner as in the step 5 of Example 1 to produce a composite nonwoven fabric. The properties thereof are shown in Table 2.

EXAMPLE 4

The nonwoven fabric made of polypropylene ultra-fine fibers as used in Example 3 was pressed under the same conditions as in the step 2 of Example 1 to produce a nonwoven fabric having a water pressure resistance of 1010 mmH$_2$O. The obtained nonwoven fabric was integrally bonded with the same heat-bonding nonwoven fabric and polypropylene spunlaid nonwoven fabric as used in Example 3 under the same conditions as in the step 5 of Example 1 to produce a composite nonwoven fabric. The properties thereof are shown in Table 2.

COMPARATIVE EXAMPLE 2

The same procedure as in Example 3 was repeated except that the nonwoven fabric made of polypropylene ultra-fine fibers and the polypropylene spunlaid nonwoven fabric were integrally bonded by heat embossing without using the heat-bonding nonwoven fabric under the conditions of an engraved roll (press-bonding area ratio=20%) temperature of 135° C., a flat roll temperature of 135° C., a pressure of 3.9 MPa and a treating speed of 20 m/min, thereby producing a composite nonwoven fabric. The properties thereof are shown in Table 2.

COMPARATIVE EXAMPLE 3

The same procedure as in Example 4 was repeated except that the press-treated nonwoven fabric made of polypropylene ultra-fine fibers and the polypropylene spunlaid nonwoven fabric were integrally bonded by heat embossing without using the heat-bonding nonwoven fabric under the conditions of an engraved roll (press-bonding area ratio=20%) temperature of 142° C., a flat roll temperature of 135° C., a pressure of 3.9 MPa and a treating speed of 20 m/min, thereby producing a composite nonwoven fabric. The properties thereof are shown in Table 2.

TABLE 2

| | Water pressure resistance (mmH$_2$O) | Water vapor permeability (g/m$^2$ · day) | Exfoliation strength (N) | Feeling |
|---|---|---|---|---|
| Example 3 | 1050 | 7560 | 18.4 | good |
| Example 4 | 1270 | 7320 | 15.5 | good |
| Comparative Example 2 | 860 | 9310 | 8.5 | hard |
| Comparative Example 3 | 680 | 8160 | 5.5 | hard |

In Examples 3 and 4, as seen from the results, the bonding was effected under mild conditions because of the use of the heat-bonding nonwoven fabric, and the water pressure resistance was improved.

In Comparative Example 2, the water pressure resistance of the nonwoven raw fabric made of polypropylene ultra-fine fibers was maintained, but lowered in Comparative Example 3. This may be attributable to the defect in the nonwoven fabric made of polypropylene ultra-fine fibers, which was resulted from the high temperature required to attain a certain degree of exfoliation strength.

The water pressure resistance measured by the method A (low pressure method) of JIS L 1092 was expressed by the water level at which water began to leak from 3 points of the test specimen. When the water level was further increased, water leaked from various points to cover the entire surface of the test specimen. In Comparative Example 3, although water leaked from 3 to 5 points of the test specimen, the water leakage was stopped by blocking these points with fingers or cellophane tapes, and even when the water level was further increased, no immediate water leakage occurred. This shows the formation of defect in the nonwoven fabric made of polypropylene ultra-fine fibers. Although the defect can be prevented to some extent by embossing at lower temperatures, such a process provides no good composite nonwoven fabric because of failure to attain a sufficient exfoliation strength. Therefore, the occurrence of defect is prevented in the present invention by the bonding process at low temperatures using the heat-bonding nonwoven fabric.

EXAMPLE 5

The nonwoven fabrics obtained in the steps 1, 3 and 4 of Example 1 were subjected to calendering between a heatable flat iron roll and a flat rubber roll having a hardness of 90° under the conditions of a flat iron roll temperature of 145° C., a flat rubber roll temperature of 80° C., a pressure of 4.9 MPa and a treating speed of 20 m/min to produce a composite nonwoven fabric. The calendering was performed with the nonwoven fabric made of polypropylene ultra-fine fibers facing the flat iron roll. The properties thereof are shown in Table 3.

TABLE 3

| | Water pressure resistance (mmH$_2$O) | Water vapor permeability (g/m$^2$ · day) | Exfoliation strength (N) | Feeling |
|---|---|---|---|---|
| Example 5 | 970 | 6390 | 20.9 | good |

Generally, the bonding by calendering makes the feeling hard. However, the hydroentangled nonwoven fabric made of a polyester fiber/rayon fiber mixture which occupied about 60% of the total mass per unit area was not hardened at the calendering temperature. Also, the thickness thereof was temporarily reduced, but soon restored because fibers are not heat-fused. The nonwoven fabric made of polypropylene ultra-fine fibers at the surface of the composite nonwoven fabric became dense as a result of reduction in its thickness due to the influence of heat. Also, the heat-bonding nonwoven fabric changed to a film shape by the influence of heat, contributing to further improve the water pressure resistance of the surface nonwoven fabric made of polypropylene ultra-fine fibers. Therefore, the hydroentangled nonwoven fabric influenced on the total feeling to create a soft and flexible feeling.

COMPARATIVE EXAMPLE 4

The nonwoven fabrics used in Comparative Example 2 were integrally bonded to each other by calendering under the same conditions as in Example 5 to produce a composite nonwoven fabric. The properties thereof are shown in Table 4.

TABLE 4

| | Water pressure resistance (mmH$_2$O) | Water vapor permeability (g/m$^2$ · day) | Exfoliation strength (N) | Feeling |
|---|---|---|---|---|
| Comparative Example 4 | 910 | 7290 | easily exfoliated | hard |

A certain level of exfoliation strength was obtained in Comparative Example 2, but the bonding process by calendering of Comparative Example 4 failed to integrally bond the fabrics because of insufficient pressure even though the fabrics were made of the same material. In Comparative Example 2, the press-bonding portions were subjected to a pressure of 19.7 MPa because 3.9 MPa was applied to the 20% press-bonding area. In Comparative Example 4, 4.9 MPa was applied to the whole surface, this being too low as compared with Comparative Example 2. The calendering at higher pressure can improve the exfoliation strength, but makes the feeling hard. Also, in the bonding of the fabrics made of the same resin by calendering, the feeling before made into the composite cannot be maintained unless the heat-bonding nonwoven fabric was used, as evidenced by Example 5.

As described above, the composite nonwoven fabric for protective clothing according to the present invention is a three-layered laminate comprising the water vapor-permeable, water-resistant nonwoven fabric, the porous fabric and the heat-bonding nonwoven fabric interposed therebetween, and provides a protective clothing that is excellent in not only the water vapor permeability and water resistance but also the feeling. Since the requirements vary depending upon applications, the water vapor permeability and the water resistance are controlled by suitably selecting the production conditions, mass per unit area and pretreatment of the water vapor-permeable, water-resistant nonwoven fabric. Also, the feeling is controlled by suitably selecting the porous fabric according to the requirements. When the sweat absorption and the antistatic property are required, a hydroentangled nonwoven fabric made of a polyester fiber/rayon fiber mixture may be used as the porous fabric. The porous fabric may also be selected from various spunlaid nonwoven fabrics and knitted or woven fabrics when the cost performance should be considered.

Since the composite nonwoven fabric is produced by integrally bonding the water vapor-permeable, water-resistant nonwoven fabric and the porous fabric via the heat-bonding nonwoven fabric, the fabrics made of different materials can be well bonded. Further, the integral bonding process may be selected from embossing and calendering according to user's preference.

What is claimed is:

1. A composite nonwoven fabric for protective clothing, comprising:
    (A) a water vapor-permeable, water-resistant nonwoven fabric made of polyolefin-based ultra-fine fibers having an average fiber diameter of 5 μm or less;
    (B) a heat-bonding nonwoven fabric made of thermoplastic elastomer ultra-fine fibers; and
    (C) a porous fabric, wherein the porous fabric is a hydroentangled nonwoven fabric comprising 100% of rayon fibers or a 30/70 to 70/30 by mass polyester fiber/rayon fiber mixture;
    the nonwoven fabric B being interposed between the nonwoven fabric A and the porous fabric C, and the fabrics A, B and C being integrally bonded to each other.

2. The composite nonwoven fabric according to claim 1, wherein the water vapor-permeable, water-resistant nonwoven fabric A is a meltblown nonwoven fabric.

3. The composite nonwoven fabric according to claim 1, wherein the water vapor-permeable, water-resistant nonwoven fabric A is made from a colored masterbatch.

4. The composite nonwoven fabric according to claim 1, wherein the heat-bonding nonwoven fabric B is a meltblown nonwoven fabric made of polystyrene-based thermoplastic elastomer ultra-fine fibers, ultra-fine fibers of a mixture of a polystyrene-based thermoplastic elastomer and a polyolefin resin, or polyolefin-based thermoplastic elastomer ultra-fine fibers.

5. The composite nonwoven fabric according to claim 1, which is made into a protective clothing.

* * * * *